United States Patent [19]

Hayashida et al.

[11] Patent Number: 4,948,763

[45] Date of Patent: Aug. 14, 1990

[54] PREPARATION OF HOLLOW CERAMIC FIBERS

[75] Inventors: Akira Hayashida; Minoru Takamizawa; Yoshihumi Takeda, all of Joetsu, Japan

[73] Assignee: Shin-Etsu Chemical Co., Ltd., Tokyo, Japan

[21] Appl. No.: 404,584

[22] Filed: Sep. 8, 1989

Related U.S. Application Data

[63] Continuation-in-part of Ser. No. 371,716, Jun. 27, 1989.

[30] Foreign Application Priority Data

Jun. 30, 1988 [JP] Japan ............................... 63-163592
Jul. 26, 1988 [JP] Japan ............................... 63-186324
Sep. 9, 1988 [JP] Japan ............................... 63-224593
Oct. 7, 1988 [JP] Japan ............................... 63-253438

[51] Int. Cl.$^5$ ......................... C04B 35/52; B05D 3/00
[52] U.S. Cl. ....................................... 501/95; 501/92; 525/475; 525/477; 427/39; 427/38; 427/372.2; 264/82; 264/173
[58] Field of Search ................... 501/92, 95; 41/84; 525/475, 477; 427/39, 38, 372.2; 264/82, DIG. 26, 173

[56] References Cited

U.S. PATENT DOCUMENTS

| H721 | 1/1990 | McQuillan | 264/56 |
|---|---|---|---|
| 4,743,662 | 5/1988 | Lipowitz | 427/39 |
| 4,870,035 | 1/1989 | Takamizawa et al. | 501/92 |

OTHER PUBLICATIONS

Card, "Preparation of Hollow Ceramic Fibers", Adv. Cer. Mat'l., vol. 3, #1, pp. 29–31 (1988).

Primary Examiner—Mark L. Bell
Assistant Examiner—Melissa Bonner
Attorney, Agent, or Firm—McAulay Fisher Nissen and Goldberg

[57] ABSTRACT

Hollow ceramic fibers are prepared by melt spinning an organic silazane polymer, infusibilizing the fiber to form an infusible layer on the surface, and pyrolyzing the fiber to obtain a ceramic fiber having an empty interior. The infusibilizing step includes two steps of treating the fiber with a gas containing the vapor of an infusibilizing silicon, boron, phosphorus or metal compound and further treating with a water vapor-containing gas or ammonia-containing gas. The surface infusible fibers are efficiently sintered into hollow ceramic fibers without fusion bond.

20 Claims, 3 Drawing Sheets

FIG.1

10μ MAGNIFICATION : 3500X

PREPARATION OF HOLLOW CERAMIC FIBERS

This is a continuation-in-part application of copending application Ser. No. 07/371,716 filed June 27, 1989.

BACKGROUND OF THE INVENTION

This invention relates to the preparation of hollow ceramic fibers predominantly composed of silicon carbide and silicon nitride.

Ceramics materials are now of great interest because of heat resistance, abrasion resistance, high-temperature strength and other useful properties. However, it is very difficult to machine ceramics because they are hard and brittle. For this reason, ceramic articles are generally prepared by a powder sintering method comprising molding powder ceramic material into a desired shape as by compaction and sintering the molded material. Also useful is a precursor method comprising melting an organic polymer as a ceramic precursor or dissolving the polymer in a solvent and shaping the melt or solution into a desired shape. The shaped polymer is then sintered to convert the material into inorganic. The precursor method has the advantage that there can be prepared ceramic articles of complex shapes which would otherwise be almost impossible to form by the powder sintering method. Articles of special shape such as fibers can be prepared by the precursor method.

Among materials generally known as ceramics, SiC and $Si_3N_4$ are particularly of great importance because of their high-temperature properties. More particularly, SiC has good heat resistance and high-temperature strength and $Si_3N_4$ is excellent in thermal shock resistance and fracture toughness. The inventors proposed a process for manufacturing organic silazane polymers for use in the manufacture of SiC—$Si_3N_4$ ceramic materials by the precursor method and a process for manufacturing ceramics from the polymers as disclosed in Takamizawa et al., U.S. Pat. No. 4,771,118, U.S. Pat. No. 4,869,854 or West German Offenlegungsschrift DE 3736914 A1, and Japanese Patent Application No. 313264/1987.

The ceramic fibers prepared from ceramic precursors by utilizing the precursor method now draw attention as reinforcements for fiber reinforced composite materials. To take advantage of their light weight, heat resistance and high strength, such ceramic fibers are combined with plastics, metals and ceramics to form composite materials. Particularly, hollow ceramic fibers having an empty space in the interior are more advantageous as reinforcements for composite materials because of lighter weight than other ceramic fibers, and also useful as light weight aggregates for heavy materials such as super hard materials, heat insulators, filtering materials and the like.

In the prior art there are known two methods for preparing such hollow ceramic fibers. A first method is by spinning a resin having inorganic powder evenly dispersed therein into a hollow fiber, and removing the resin from the hollow fiber as disclosed in U.S. Pat. Nos. 4,104,445, 4,175,153, and 4,222,977. A second method involves impregnating carbon fibers with a metal salt, drying and sintering the fibers into a ceramic state, followed by oxidation to remove the core carbon fiber as disclosed in Japanese Patent Application Kokai No. 245315/1986. However, the first method cannot form thin fibers because the mixture of resin and inorganic powder dispersed therein is spun into hollow shape. The second method increases cost because carbon fibers are used as the core. These prior art methods are less practical.

SUMMARY OF THE INVENTION

An object of the present invention is to provide an economical method capable of preparing hollow ceramic fibers of quality from a ceramic precursor in the form of an organic silazane polymer in a simple and convenient manner.

According to the present invention, there is provided a method for preparing a hollow ceramic fiber, comprising the steps of:

(A) melt spinning an organic silazane polymer into a fiber, (B) treating the surface of the fiber with a gas containing the vapor of at least one compound selected from the group consisting of compounds of formulae (1) through (4) defined below, (C) subjecting the fiber to hydrolysis with a water vapor-containing gas or ammonolysis with ammonia-containing gas, thereby forming an infusible layer on the fiber surface, and (D) subjecting the fiber to pyrolysis to form a hollow ceramic fiber having an empty interior.

The infusibilizing compounds of formulae (1) through (4) used in step (B) are:

silicon compounds of formula (1):

$$R_aSiX_{4-a} \qquad (1)$$

wherein R is a radical selected from the group consisting of hydrogen, lower alkyl, alkenyl, and aryl radicals, X is a chlorine, bromine or iodine atom, and letter a has a value of from 0 to 2 (both inclusive), R radicals may be the same or different when a is equal to 2;

boron compounds of formula (2):

$$BX_3 \qquad (2)$$

wherein X is as defined above;

phosphorus compounds of formula (3):

$$PX_b \qquad (3)$$

wherein X is as defined above, and letter b is equal to 3 or 5; and metal compounds of formula (4):

$$MX_c \qquad (4)$$

wherein M is a metal selected from the group consisting of Al, Ti, V, Fe, Ga, Ge, Zr, Nb, Sn, Sb, Te, Ta, W, and Bi, letter c is a number equal to the valence of the metal, and X is as defined above.

The method can produce hollow ceramic fibers of quality from the ceramic precursor in the form of an organic silazane polymer in a simple, easy and inexpensive manner.

The reason why the present method is effective in preparing hollow ceramic fibers is not well understood although the following series of reactions are contemplated.

In step (B), =N—H radicals on the fiber surface react with the infusibilizing agent according to the following reaction scheme I:

reaction scheme I:

Then in step (C), a gas containing water vapor is passed over the surface of the fiber resulting from step (B) whereby hydrolysis takes place according to the following reaction scheme II such that oxygen linkages span between infusibilizing agents attached to the fiber surface.

Reaction scheme II:

Alternatively, gaseous ammonia or a gas containing ammonia is passed over the surface of the fiber whereby ammonolysis takes place according to the following reaction scheme II' such that nitrogen linkages span between infusibilizing agents attached to the fiber surface.

Reaction scheme II':

The linkages between the infusibilizing agents through oxygen or nitrogen will spread in a three-dimensional manner to form a layer or film on the fiber surface, completing infusibilization. The fibers having an infusible layer formed through the infusibilizing process are then pyrolyzed into ceramic state whereupon the fibers shrink with a weight loss. The fibers will have a variable form depending on particular infusibilizing conditions. More particularly, if the infusible layer formed by three-dimensional development of oxygen or nitrogen linkages is short, then fibers would be fusion bonded together. If the layer is infusible, but weak, then the resulting fibers would have a flattened or oval cross section due to shrinkage upon pyrolysis. However, since the infusible layer which is formed by a primary infusibilizing step followed by hydrolysis or ammonolysis according to the present invention is resistant to deformation upon subsequent pyrolysis, the subsequent pyrolysis causes shrinkage to occur only in the interior to form an empty space, resulting in hollow fibers.

BRIEF DESCRIPTION OF THE DRAWINGS

The present invention is illustrated by way of example in the figures of the accompanying drawings, in which.

DETAILED DESCRIPTION OF THE INVENTION

The organic silazane polymer which is the starting material of the present method may be any desired one selected from conventional well-known organic silazane polymers, preferably the organic silazane polymers which are disclosed by the present inventors in the aforementioned U.S. Pat. No. 4,771,118, U.S. Pat. No. 4,869,854, and Japanese Patent Application No. 313264/1987.

According to the process of U.S. Pat. No. 4,771,118, an organic silazane polymer is prepared by reacting ammonia with a mixture of methyldichlorosilane, methyltrichlorosilane and dimethyldichlorosilane to obtain an ammonolysis product, and condensing the ammonolysis product in the presence of a basic catalyst capable of deprotonation. The mixture of methyldichlorosilane, methyltrichlorosilane and dimethyldichlorosilane is preferably composed of from 55 to 80 mol % of methyldichlorosilane, from 10 to 30 mol % of methyltrichlorosilane, and from 5 to 25 mol % of dimethyldichlorosilane.

According to the process of U.S. Pat. No. 4,869,854, an organic silazane polymer is prepared from a mixture of (i) at least one compound selected from the group consisting of organic silicon compounds of general formulae (I) and (II):

and and (ii) an organic silicon compound of general formula (III):

In formulae (I), (II), and (III), R is a radical selected from the group consisting of hydrogen, chlorine, bromine, methyl, ethyl, phenyl, and vinyl radicals, $R^1$ is hydrogen or a methyl radical, $R^2$ is a radical selected from the group consisting of hydrogen, methyl, ethyl, phenyl, and vinyl radicals, and X is chlorine or bromine. Like the process of U.S. Pat. No. 4,771,118, the organic silicon compound mixture is reacted with ammonia, and the resulting ammonolysis product is deprotonation condensed to form an organic silazane polymer.

The mixture is preferably composed of 0 to 30 mol % of compound (I), 0 to 30 mol % of compound (II), and 40 to 85 mol % of compound (III). More preferably, the mixture is composed of 1 to 25 mol % of compound (I), 1 to 25 mol % of compound (II), and 50 to 80 mol % of compound (III). When a mixture containing compounds (I), (II), and (III) in such a proportion is prepared, compounds (II) and (III) are preferably selected such that $R^2$ in organic silicon compounds (II) and (III) is comprised of 55 to 90 mol % of hydrogen, 0 to 30 mol % of vinyl radical, and 0 to 30 mol % of alkyl or phenyl radical, more preferably 55 to 80 mol % of hydrogen, 0 to 25 mol % of vinyl radical and 0 to 25 mol % of alkyl or phenyl radical.

Examples of compound (I) include 1,2-bis(chlorodimethylsilyl)ethane, 1,2-bis(dichloromethylsilyl)ethane, and 1,2-bis(trichlorosilyl)ethane. Examples of compound (II) include methyltrichlorosilane, trichlorosilane, and vinyltrichlorosilane. Examples of compound (III) include methyldichlorosilane, dimethyldichlorosilane, methylvinyldichlorosilane, and vinyldichlorosilane.

Preferably, a mixture of methyldichlorosilane, methyltrichlorosilane, and an organic silicon compound of formula (I) is used. More preferred is a mixture of 55 to 90 mol % of methyldichlorosilane, 5 to 30 mol % of methyltrichlorosilane, and 2 to 30 mol % of an organic silicon compound of formula (I).

In the above-mentioned processes, it is not critical how to prepare an ammonolysis product from a mixture of methylchlorosilanes. One exemplary convenient procedure is by reacting the mixture with gaseous NH$_3$ in organic solvent, removing the ammonium chloride byproduct, and stripping the reaction mixture of the organic solvent. Other procedures will occur to those skilled in the art.

Thereafter, the ammonolysis product is polymerized in the presence of a basic catalyst capable of deprotonation. Preferably, the ammonolysis product is subjected to deprotonation condensation with the catalyst in solvent to complete the reaction. The basic deprotonation catalyst includes alkali and alkaline earth metal hydrides and amides such as KH, NaH, NaNH$_2$, and KNH$_2$. The solvent used may be ethers such as THF and dialkyl ethers, aliphatic hydrocarbons such as pentane and hexane, and aromatic hydrocarbons such as benzene, toluene, and xylene. Although polymerization generally takes place at room temperature, an appropriate polymerization temperature may be selected in the range of 0° to 200° C. depending on the type of solvent.

After the completion of deprotonation condensation, the remaining basic catalyst is preferably decomposed with an electrophilic compound such as methyl iodide. The resulting insoluble matter is removed by filtration and the solvent is distilled off in vacuum.

According to the process of Japanese Patent Application No. 313264/1987, an organic silazane polymer is prepared by reacting a mixture of (i) at least one organic silicon compound of general formula (IV):

(IV)

and (ii) at least one organic silicon compound of general formula (V):

(V)

with ammonia to form a silazane compound, and polymerizing the silazane compound in the presence of an alkali catalyst such as KOH and NaOH. In formulae (IV) and (V), $R^3$ is a methyl, ethyl, or phenyl radical, $R^4$ is hydrogen or a vinyl radical, and X is chlorine or bromine.

Any desired compounds of formula (VI) may be used as long as they fall within the above definition, with dimethyldichlorosilane being most preferred.

Among compounds of formula (V), preferred are those wherein $R^4$ is a vinyl radical, that is, vinyl-containing organic silicon compounds of the formula:

(Va)

Most preferred is methylvinyldichlorosilane.

It is also preferred to use as the compound of formula (V) a mixture of a compound of formula (Va) defined above and a compound wherein $R^4$ is hydrogen, that is, an organic silicon compound of the formula:

(Vb)

such as methyldichlorosilane.

For the mixture used herein, a compound of formula (IV) and a compound of formula (V) are preferably mixed in a proportion of from 20/80 to 90/10 in mol %, more preferably from 30/70 to 80/20 in mol %. When the compound of formula (V) is a vinyl-containing organic silicon compound of formula (Va) and a hydrogen-containing organic silicon compound of formula (Vb) as defined above, they may preferably be mixed in a proportion of from 5/95 to 95/5 in mol %, more preferably from 20/80 to 80/20 in mol %.

In forming a silazane compound by reacting a mixture of organic silicon compounds as defined above with ammonia, the manner of ammonia reaction is not particularly limited. One exemplary convenient procedure is by reacting the mixture with gaseous NH$_3$ in organic solvent, removing the ammonium chloride byproduct, and stripping the reaction mixture of the organic solvent. Other procedures will occur to those skilled in the art. The organic solvent used herein may be pentane, hexane, benzene, toluene, xylene, and diethyl ether, for example. The amount of ammonia used should be at least equal to, preferably about 1.2 to 1.5 times the moles of chlorine in the chlorosilanes used.

Thereafter, the resulting silazane compound is polymerized in the presence of an alkali catalyst. The preferred alkali catalysts used herein are KOH and NaOH. The amount of the catalyst added generally ranges from 0.1 to 5% by weight, preferably 0.1 to 2% by weight based on the silazane compound. Polymerization generally takes place without solvent, but may be carried out in solvent. Any desired one of commonly used organic solvents may be employed insofar as it has an appropriate boiling point compared to the polymerization temperature. The polymerization temperature varies with a particular silazane compound, but may be selected in the range between 0° C. and 350° C., preferably between 20° C. and 300° C. depending on the degree of polymerization desired for the resulting polymer. The post treatment is not particularly limited. One recommendable post treatment involves dissolving the polymer in an organic solvent, removing the insoluble by filtration, and stripping the solution of the solvent under atmospheric pressure or vacuum.

Also useful is the organic silazane polymer which is prepared by heat polymerizing hexamethylcyclotrisilazane having the unit:

in the presence of KOH according to the teaching of Andrianov, S., Vysokomol. Soyed, 4, NOT, 1060–1063 (1962).

These organic silazane polymers are useful ceramic precursors in that they can be shaped into fibers by a melt spinning process and pyrolyzed into ceramic materials composed of SiC—Si$_3$N$_4$. According to the present invention, an infusible layer is formed on the surface of fibers prior to pyrolysis. The present invention accomplishes infusibilization in two steps. More specifically, fibers which are obtained by melt spinning an organic silazane polymer are infusibilized by a first step of treating with a gas containing the vapor of at least one infusibilizing agent of formulae (1) through (4) and a second step of treating with a water vapor-containing gas or ammonia-containing gas, thereby forming a strong infusible layer on the fiber surface. During the two-step infusibilization process, reaction takes place according to the above-mentioned reaction scheme I and II or II′ whereby linkages of the infusibilizing agent of formula (1), (2), (3) or (4) via oxygen or nitrogen grow as a three-dimensional network to form an infusible layer on the fiber surface. The infusible layer is fully resistant to deformation when shrinkage occurs during subsequent pyrolysis at elevated temperatures. Pyrolysis takes place in the fibers without substantial deformation of the infusible surface layer, leaving ceramic fibers having an empty space in the interior.

The first infusibilizing step will be described in detail. The infusibilizing compounds of formulae (1) through (4) are shown below.

A first group of infusibilizing agents is silicon compounds of formula (1):

$$R_a SiX_{4-a} \quad (1)$$

wherein R is a hydrogen atom, a lower alkyl radical (preferably having 1 to 3 carbon atoms), an alkenyl radical (preferably having 2 to 3 carbon atoms), or an aryl radical (preferably having 6 to 9 carbon atoms), X is a chlorine, bromine or iodine atom, and letter a has a value of from 0 (inclusive) to 2 (inclusive), R radicals may be the same or different when a is equal to 2.

A second group of infusibilizing agents is boron compounds of formula (2):

$$BX_3 \quad (2)$$

wherein X is as defined above.

A third group of infusibilizing agents is phosphorus compounds of formula (3):

$$PX_b \quad (3)$$

wherein X is as defined above, and letter b is equal to 3 or 5.

A fourth group of infusibilizing agents is metal compounds of formula (4):

$$MX_c \quad (4)$$

wherein M is a metal selected from the group consisting of Al, Ti, V, Fe, Ga, Ge, Zr, Nb, Sn, Sb, Te, Ta, W, and Bi, letter c is a number equal to the valence of the metal, and X is as defined above.

Some preferred examples of the infusibilizing agents having formulae (1) through (4) include CH$_3$SiCl$_3$, (CH$_3$)$_2$SiCl$_2$, (C$_2$H$_5$)SiCl$_3$, (C$_2$H$_5$)$_2$SiCl$_2$, C$_6$H$_5$SiCl$_3$, (C$_6$H$_5$)$_2$SiCl$_2$, CH$_2$=CHSiCl$_3$, (CH$_2$=CH)$_2$SiCl$_2$, HSiCl$_3$, H$_2$SiCl$_2$, SiCl$_4$, H(CH$_3$)SiCl$_2$, H(CH$_2$=CH)SiCl$_2$, (CH$_2$=CH)C$_6$H$_5$SiCl$_2$, BCl$_3$, BBr$_3$, BI$_3$, PCl$_3$, PCl$_5$, PBr$_3$, PI$_3$, AlCl$_3$, TiCl$_4$, FeCl$_3$, VCl$_4$, GaCl$_3$, GeCl$_4$, ZrCl$_4$, NbCl$_5$, SnCl$_4$, SbCl$_3$, TaCl$_5$, TeCl$_4$, WCl$_5$, and BiCl$_3$. They may be used alone or in admixture of two or more. Most preferred are H(CH$_3$)SiCl$_2$, HSiCl$_3$, BCl$_3$, PCl$_3$, AlCl$_3$, and TiCl$_4$.

The fibers may be treated with a gas containing the infusibilizing agent in any desired manner. For example, an inert gas such as nitrogen (N$_2$), argon (Ar), and helium (He) may be used as a carrier gas. The carrier gas is passed into the infusibilizing agent and then to a region where the fibers are placed whereupon the fibers are contacted with the carrier gas having the vapor of the agent carried thereon. The concentration of the infusibilizing agent in the gas may be controlled to a desired level by adjusting the temperature of the infusibilizing agent source so as to give an appropriate vapor pressure. If the concentration of the agent in the gas is too high, the gas may be diluted with an inert gas. In general, the concentration of infusibilizing agent vapor is preferably controlled to 0.0001 to 0.1 mol, more preferably 0.01 to 0.05 mol of the agent per liter of the carrier gas. The treating temperature and time vary with a particular type of organic silazane polymer used. Usually, the treating temperature is a sufficiently low temperature to maintain the polymer infusible, that is, a temperature sufficiently lower than the melting point of the polymer, preferably a temperature lower by 20° to 100° C., most preferably by 25° to 80° C., than the melting point of the polymer. The treating time is a sufficient time to render the fibers substantially infusible, preferably about 5 to about 240 minutes, more preferably about 10 to about 120 minutes. If the concentration of the infusibilizing agent vapor is low, the treating time is desirably extended because there is a possibility that fibers will be fusion bonded together. In turn, if the concentration of the infusibilizing agent vapor is high, the treating time is desirably reduced because there is a possibility that a gel will form on the fiber surface, reducing the fiber strength after sintering.

At the end of the first infusibilizing step, the polymer fibers become insoluble in commonly used solvents, for example, benzene, hexane, toluene, and tetrahydrofuran. However, the polymer fibers resulting from only the first infusibilizing step are not fully infusible and will melt during subsequent pyrolysis. The second step of treating with a water vapor-containing gas or ammonia-containing gas is essential to enhance the infusibility of polymer fibers. The term "water vapor-containing gas" encompasses water vapor and any gases containing a concentration of water vapor. The term "ammonia-containing gas" encompasses pure gaseous ammonia and any gases containing ammonia.

The manner of treatment in the second step is not particularly limited. In the case of treatment with a water vapor-containing gas, for example, the fibers resulting from the first infusibilizing step may be simply exposed in air for a predetermined time to render the fibers completely infusible. The air exposure is simple, but somewhat difficult to consistently yield ceramic fibers having high strength and modulus while maintaining the hollow shape because the humidity in air is not always constant. Due to varying humidity, subsequent pyrolysis will result in fibers having a varying oxygen content or fused fibers. Therefore, the second step is preferably carried out by passing air or an inert gas such as nitrogen and argon into water at a controlled temperature, more preferably bubbling air or inert gas through water at a predetermined rate, thereby forming air or inert gas containing saturated water vapor at the temperature. The resulting gas with saturated water vapor is passed over the fibers for a sufficient time to complete infusibilization. The temperature of water into which air or inert gas is bubbled at the predetermined rate may preferably vary over the range of 0° to 100° C., more preferably 0° to 70° C., most preferably 0° to 30° C. The moisture loading in the gas or air is preferably set at 0.6 to 100 mol %, more preferably 0.6 to 30 mol %, most preferably 0.6 to 4.2 mol %.

In the case of ammonia gas treatment, infusibilizing may be completed by exposing the fibers resulting from the first infusibilizing step to ammonia gas or ammonia gas diluted with an inert gas. In the second step, the ammonia gas concentration preferably ranges from 0.01 to 100% by volume, more preferably from 0.2 to 50% by volume, most preferably from 0.5 to 10% by volume. If the ammonia concentration is too high, the ammonia gas is diluted with a rare gas such as argon and helium or an inert gas such as nitrogen gas. The ammonia gas with or without a diluent gas may be passed over the fibers for a sufficient time to complete infusibilization.

The treating temperature and time in the second step will vary with a particular type of organic silazane polymer used as in the first step. Usually, the treating temperature is a temperature sufficiently lower than the melting point of the polymer, preferably in the range of from 0° C. to a temperature lower by 30° C. than the melting point of the polymer. The treating time is a sufficient time to complete infusibilization, preferably about 30 to about 360 minutes. Lower temperatures below 0° C. are less desirable for economy whereas temperatures higher than the melting point of the polymer minus 30° C. would probably cause fusion welding of fibers. Treating times less than 30 minutes are sometimes too short to ensure that fibers be hollow at the end of pyrolysis whereas treating times longer than 360 minutes would often cause the fibers to lose strength.

The polymeric fibers thus made infusible at their surface are then sintered for pyrolysis in a conventional manner, yielding hollow ceramic fibers. For example, any one of the organic silazane polymers the inventors proposed may be shaped into fibers and infusibilized by the above-mentioned two steps. The resulting surface-infusible fibers are sintered at high temperatures under tension or in free state, resulting in hollow ceramic fibers composed mainly of SiC and $Si_3N_4$ and having high strength and modulus. Sintering is preferably carried out in vacuum or in an inert gas such as argon or in an atmosphere of nitrogen ($N_2$), hydrogen ($H_2$) or ammonia ($NH_3$) gas at a temperature of about 700 to about 2000° C., more preferably about 700° to about 1600° C. Also preferably, the surface-infusible fibers are sintered under tension. Under such preferred conditions, there are produced hollow ceramic fibers of quality as typified by a tensile strength of 100 to 200 kg/mM$^2$ and a modulus of elasticity of 10 to 20 t/mM$^2$.

EXAMPLE

Examples of the present invention are given below together with comparative examples by way of illustration and not by way of limitation.

EXAMPLE 1

A dry 2-liter four-necked flask equipped with a stirrer, a thermometer, an ammonia admission tube, and a water-cooled condenser was charged with 1500 ml of hexane. To the flask were added 83.38 grams of methyldichlorosilane, 22.59 grams of methyltrichlorosilane, and 16.0 grams of dimethyldichlorosilane. Excess gaseous ammonia was introduced into the solution at room temperature at a flow rate of 90 liter/hour for 1¼ hours. The total amount of ammonia added was 5.0 mol. The reaction mixture was allowed to stand at room temperature while the condenser was replaced by an air-cooled condenser for allowing the unreacted ammonia to escape from the flask. The ammonium chloride by-product was removed from the reaction mixture by filtration in a dry box. The cake was then washed three times with 1.5 liters of hexane. The filtrate was stripped of the hexane under a vacuum of 1 mmHg at 60° C. The residue or ammonolysis product was a clear free-flowing liquid in a yield of 52.0 grams.

Next, a 500-ml three-necked flask equipped with a stirrer, a thermometer, and a dropping funnel was placed in a dry box and charged with 0.4 grams of potassium hydride and 250 ml of tetrahydrofuran (THF) which had been dehydrated with NaH. The flask was taken out of the dry box and connected to a nitrogen gas tube. While the mixture was stirred at room temperature to disperse potassium hydride, 40 grams of the ammonolysis product in 100 ml of THF was slowly added to the mixture over one hour through the dropping funnel. Large amounts of gases evolved during the addition. After 2 hours, the reaction temperature was raised to the reflux temperature of THF and maintained at the temperature for a further 1½ hours. The gases ceased to evolve after 3½ hours from the start of reaction. The flask was cooled down to room temperature before 4 grams of methyl iodide was added, yielding a white precipitate of KI. The reaction mixture was stirred for a further 30 minutes and then distilled of the majority of THF solvent under vacuum to leave a white slurry, to which 100 ml of hexane was added. The mixture was filtered and the filtrate was stripped of the hexane under a vacuum of 1 mmHg at 180° C., yielding 36.5 grams of a silazane polymer in the form of a viscous solid. The polymer had a melting point of 143° C. and a molecular weight of 1200 as measured by a benzene molar depression of freezing point method. It was soluble in hexane, benzene, THF and other organic solvents. An IR analysis of the polymer showed absorption peaks at 3400 cm$^{-1}$ for NH, 2980 cm$^{-1}$ for C—H, 2150 cm$^{-1}$ for Si—H, and 1260 cm$^{-1}$ for Si—CH$_3$.

The silazane polymer designated Polymer A was heated at 160° C. and melt spun through a spinneret having an orifice of 0.2 mm in diameter. The resulting green or pre-ceramic fibers had a diameter of 12 to 13 µm.

The fibers in a weight of 0.05 to 0.2 grams were rested on an alumina boat, which was placed in a mullite tube furnace of 50 mm in diameter. After the furnace was purged with an inert gas of N$_2$ or Ar, the furnace was ready for the first infusibilizing step. Nitrogen gas was passed through a bubbling apparatus charged with trichlorosilane, obtaining a nitrogen gas containing trichlorosilane gas in a predetermined concentration. The concentration of trichlorosilane gas was controlled in terms of temperature. The trichlorosilane-carrying nitrogen gas was passed through the furnace.

The second infusibilizing step was carried out by purging the furnace with an inert gas of N$_2$ or Ar again. The fibers were treated with wet air for varying time, making the fibers infusible. The wet air used herein was prepared by bubbling air into water at room temperature to form wet air having a relative humidity of 100% at room temperature. After the fibers were treated with wet air for a predetermined time, the furnace was purged with nitrogen gas again and heated to a temperature of 1200° C. at a rate of 150° C./hour in a nitrogen stream. The fibers were pyrolyzed at the temperature for 30 minutes and then cooled down.

Table 1 shows the conditions for the trichlorosilane treatment, wet air treatment, and sintering as well as the appearance of sintered fibers.

TABLE 1

| | Trichlorosilane treatment (first step) | | | Wet air treatment (second step) | | | | |
|---|---|---|---|---|---|---|---|---|
| Sample No. | Gas conc. (mol/l) | Treat time (min.) | Sample temp. (°C.) | Water temp. (°C.) | Air bubbling (l/hr.) | Treat time (min.) | Sample temp. (°C.) | Shape of fibers after sintering |
| 1 | 0.02 | 15 | 50 | 25 | 13 | 60 | 50 | hollow |
| 2 | 0.02 | 15 | 50 | 25 | 13 | 120 | 50 | hollow |
| 3 | 0.02 | 15 | 50 | 25 | 13 | 240 | 50 | hollow |
| 4 | 0.01 | 15 | 50 | 25 | 13 | 60 | 50 | hollow |
| 5 | 0.005 | 15 | 50 | 25 | 13 | 60 | 50 | hollow |

Figure 1:
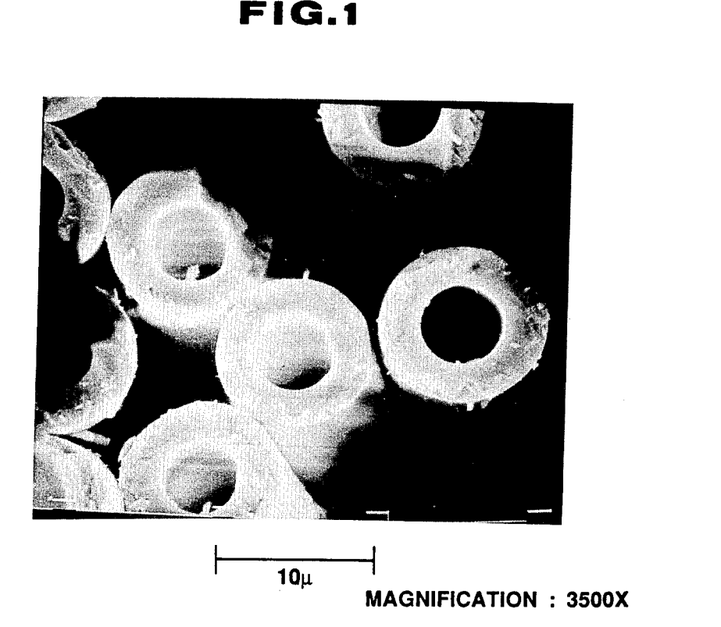
FIG. 1 is a photomicrograph (X3, 500) of a hollow ceramic fiber in cross section of sample No. 1 in Example 1.
Figures 2A, 2B:
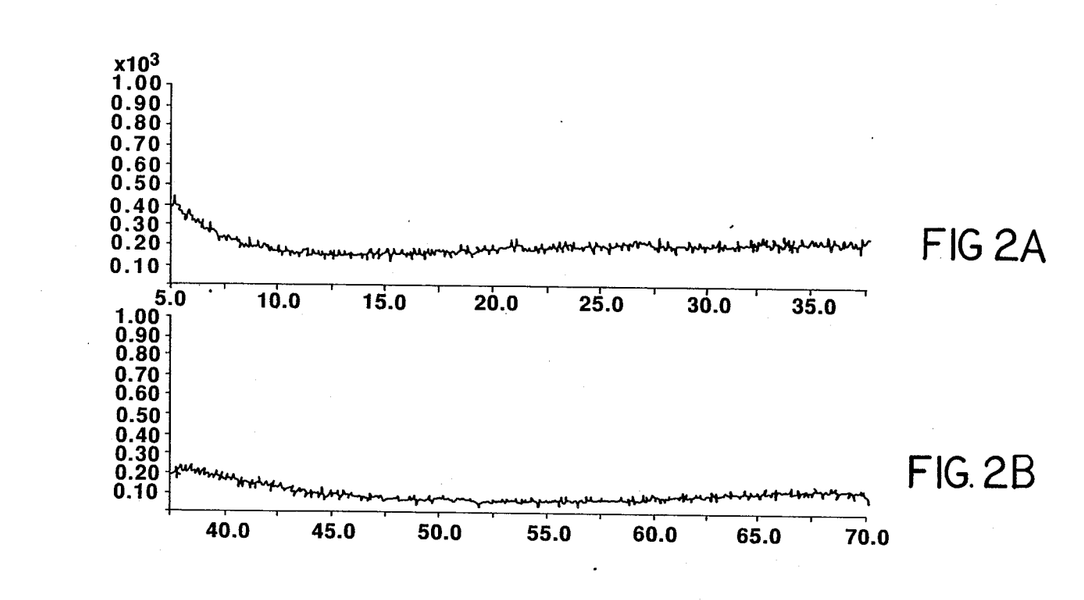
FIG. 2 is a diagram showing the X-ray diffraction pattern of hollow ceramic fiber No. 1 in Example 1 sintered at 1200° C.
Figure 3A:
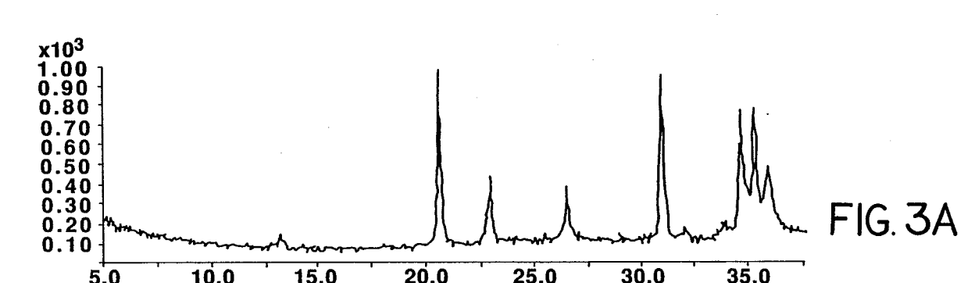
FIG. 3 is a diagram showing the X-ray diffraction pattern of hollow ceramic fiber No. 1 which was further sintered at 1700° C.
Figure 3B:
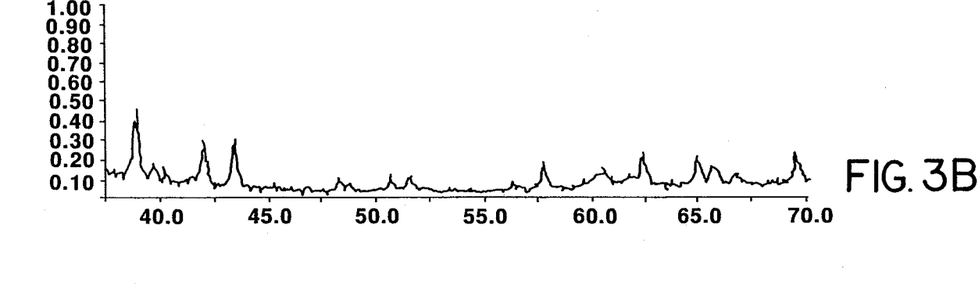

As is evident from the data of Table 1, all the fibers were in hollow shape at the end of sintering. The sintered fibers of sample No. 1 were measured for physical properties. As seen from FIG. 1, a photomicrograph of fiber cross section under a scanning electron microscope with a magnification X3,500, the fibers were of hollow shape having an outer diameter of about 10 µm and an inner diameter of about 6 µm. They had a tensile strength of 150 kg/mm$^2$ and a tensile modulus of 12 t/mM$^2$. They were found to be ceramic fibers composed mainly of SiC and Si$_3$N$_4$ and having a composition: Si 56.7%, C 16.8%, N 11.5%, and O 15.0%. An X-ray diffraction analysis of sample No. 1 is shown in FIG. 2 indicating that the fibers were amorphous. The fibers were further heated at 1,700° C. and analyzed by X-ray diffraction again, with the result shown in FIG. 3 demonstrating that the fibers were of ceramics composed of SiC and Si$_3$N$_4$.

EXAMPLE 2

Fibers having a diameter of 12 to 13 µm obtained by melt spinning Polymer A in Example 1 were infusibilized and sintered by the same procedures as in Example 1 except that the infusibilizing agent used in the first infusibilizing step was changed.

Table 2 shows the conditions for the first and second infusibilizing steps as well as the appearance of sintered fibers.

TABLE 2

| | First step | | | | Second step (Wet air treatment) | | | | |
|---|---|---|---|---|---|---|---|---|---|
| Sample No. | Type of agent | Gas conc. (mol/l) | Treat time (min.) | Sample temp. (°C.) | Water temp. (°C.) | Air bubbling (l/hr.) | Treat time (min.) | Sample temp. (°C.) | Shape of fibers after sintering |
| 6 | H(CH$_3$)SiCl$_2$ | 0.02 | 30 | 50 | 25 | 10 | 60 | 50 | hollow |
| 7 | SiCl$_4$ | 0.02 | 30 | 50 | 25 | 10 | 60 | 50 | hollow |
| 8 | BCl$_3$ | 0.02 | 30 | 70 | 25 | 10 | 60 | 50 | hollow |
| 9 | PCl$_3$ | 0.02 | 30 | 70 | 25 | 10 | 60 | 50 | hollow |
| 10 | TiCl$_4$ | 0.02 | 30 | 80 | 25 | 10 | 60 | 50 | hollow |
| 11 | AlCl$_3$ | 0.02 | 30 | 80 | 25 | 10 | 120 | 50 | hollow |
| 12 | AlCl$_3$ | 0.02 | 30 | 80 | 25 | 10 | 120 | 50 | hollow |

As is evident from the data of Table 2, better results were obtained when boron, phosphorus, titanium, and aluminum compounds were used as the infusibilizing agent in the first step instead of the silicon compound. In particular, the sintered hollow fibers of sample No. 9 which was treated with PCl$_3$ had an outer diameter of 10.5 µm and showed outstanding physical properties, a tensile strength of 160 kg/mm$^2$ and a tensile modulus of 15 t/m$^2$.

EXAMPLE 3

The starting mixture was a mixture of methyldichlorosilane, 1,2-bis(methyldichlorosilyl)ethane, and methyltrichlorosilane in a proportion of 70:10:20 in mol %. A silazane polymer designated Polymer B was obtained by following the procedure of Example 1, that is, by reacting the chlorosilane mixture with ammonia and subjecting the ammonolysis product to deprotonation condensation in the presence of KH. The polymer had a melting point of 96° C. and a molecular weight of 1050 as measured by a benzene molar depression of freezing point method.

Using spinning equipment as in Example 1, the silazane polymer designated Polymer B was melt spun at 120° C. into pre-ceramic fibers having a diameter of 13 to 14 μm. The fibers were placed in a mullite tube furnace, infusibilized by the same procedures as in Example 1 except that the infusibilizing agent and treating conditions were changed, and finally sintered as in Example 1.

Table 3 shows the conditions for the first and second infusibilizing steps as well as the appearance of sintered fibers.

TABLE 3

| Sample No. | First step | | | | Second step (Wet air treatment) | | | | Shape of fibers after sintering |
|---|---|---|---|---|---|---|---|---|---|
| | Type of agent | Gas conc. (mol/l) | Treat time (min.) | Sample temp. (°C.) | Water temp. (°C.) | Air bubbling (l/hr.) | Treat time (min.) | Sample temp. (°C.) | |
| 13 | $(CH_2=CH)CH_3SiCl_2$ | 0.05 | 30 | 50 | 15 | 20 | 60 | 50 | hollow |
| 14 | $(CH_2=CH)CH_3SiCl_2$ | 0.05 | 30 | 50 | 15 | 20 | 120 | 50 | hollow |
| 15 | $(CH_2=CH)SiCl_3$ | 0.02 | 30 | 30 | 15 | 10 | 60 | 50 | hollow |
| 16 | $ZrCl_4$ | 0.02 | 30 | 50 | 15 | 10 | 60 | 50 | hollow |
| 17 | $PBr_3$ | 0.02 | 30 | 50 | 15 | 10 | 60 | 50 | hollow |
| 18 | $PCl_5$ | 0.02 | 30 | 50 | 15 | 10 | 60 | 50 | hollow |

As is evident from the data of Table 3, hollow fibers were obtained in all the runs.

EXAMPLE 4

A silazane polymer was prepared from a halosilane mixture by the process of Japanese Patent Application No. 313264/1987. The starting mixture was a mixture of dimethyldichlorosilane and methylvinyldichlorosilane in a proportion of 50:50 in mol %. The chlorosilane mixture was reacted with ammonia in hexane solvent. The resulting ammonolysis product, 30 grams, was polymerized at 280° C. in the presence of 0.3 grams of KOH, yielding 23 grams of a silazane polymer designated Polymer C. The polymer had a melting point of 113° C. and a molecular weight of 1511 as measured by a benzene molar depression of freezing point method. An IR analysis showed absorption peaks at 3400 cm$^{-1}$ for NH, 2980 cm$^{-1}$ for C—H, 1420 cm$^{-1}$ for $CH_2=CH$, and 1260 cm$^{-1}$ for Si—$CH_3$.

Polymer C was melt spun at 130° C. by the same procedure as in Example 1, forming pre-ceramic fibers having a diameter of 10 to 12 μm. The fibers were placed in a mullite tube furnace, infusibilized by the same procedures as in Example 1 except that the infusibilizing agent and treating conditions were changed, and finally pyrolyzed at 1200° C. as in Example 1.

Table 4 shows the conditions for the first and second infusibilizing steps as well as the appearance of sintered fibers.

As is evident from the data of Table 4, hollow fibers were obtained in all the runs.

EXAMPLE 5

An organic silazane polymer was prepared according to the process of U.S. Pat. No. 4,771,118. A dry 2-liter four-necked flask equipped with a stirrer, a thermometer, an ammonia admission tube, and a water-cooled condenser was charged with 1500 ml of hexane. To the flask were added 80.5 grams of methyldichlorosilane, 14.9 grams of methyltrichlorosilane, and 25.8 grams of dimethyldichlorosilane. Excess gaseous ammonia was introduced into the solution at room temperature at a flow rate of 90 liter/hour for 1¼ hours. The total amount of ammonia added was 5.0 mol. The reaction mixture was allowed to stand at room temperature while the condenser was replaced by an air-cooled condenser for allowing the unreacted ammonia to escape from the flask. The ammonium chloride by-product was removed from the reaction mixture by filtration in a dry box. The cake was then washed three times with 1.5 liters of hexane. The filtrate was stripped of the hexane under a vacuum of 1 mmHg at 60° C. The residue or ammonolysis product was a clear free-flowing liquid in a yield of 52.5 grams.

Next, a 500-ml three-necked flask equipped with a stirrer, a thermometer, and a dropping funnel was placed in a dry box and charged with 0.4 grams of potassium hydride and 250 ml of tetrahydrofuran (THF) which had been dehydrated with NaH. The flask was taken out of the dry box and connected to a nitrogen gas tube. While the mixture was stirred at room temperature to disperse potassium hydride, 52.5 grams of the ammonolysis product in 100 ml of THF was slowly added to the mixture over one hour through the dropping funnel. Large amounts of gases evolved during the addition. After 2 hours, the reaction temperature was raised to the reflux temperature of THF and maintained at the temperature for a further 1½ hours. The gases ceased to evolve after 3½ hours from the start of reaction. The flask was cooled down to room temperature before 4 grams of methyl iodide was added, yielding a white precipitate of KI. The reaction mixture

TABLE 4

| Sample No. | First step | | | | Second step (Wet air treatment) | | | | Shape of fibers after sintering |
|---|---|---|---|---|---|---|---|---|---|
| | Type of agent | Gas conc. (mol/l) | Treat time (min.) | Sample temp. (°C.) | Water temp. (°C.) | Air bubbling (l/hr.) | Treat time (min.) | Sample temp. (°C.) | |
| 19 | $CH_3SiCl_3$ | 0.02 | 30 | 40 | 15 | 20 | 60 | 40 | hollow |
| 20 | $(CH_3)_2SiCl_2$ | 0.02 | 30 | 40 | 15 | 20 | 120 | 40 | hollow |
| 21 | $(CH_2=CH)SiCl_3$ | 0.02 | 30 | 40 | 15 | 20 | 60 | 40 | hollow |
| 22 | $FeCl_3$ | 0.1 | 30 | 50 | 15 | 20 | 120 | 50 | hollow |
| 23 | $SnCl_4$ | 0.05 | 30 | 50 | 15 | 20 | 120 | 50 | hollow | was stirred for a further 30 minutes and then distilled of the majority of THF solvent under vacuum to leave a white slurry, to which 100 ml of hexane was added. The Table 5 shows the conditions for the trichlorosilane treatment, ammonia gas treatment, and sintering as well as the appearance of sintered fibers.

TABLE 5

| Sample No. | Trichlorosilane treatment (first step) | | | Ammonia gas treatment (second step) | | | Shape of fibers after sintering |
|---|---|---|---|---|---|---|---|
| | Gas conc. (mol/l) | Treat time (min.) | Sample temp. (°C.) | Gas conc. (vol %) | Treat time (min.) | Sample temp. (°C.) | |
| 31 | 0.001 | 15 | r.t. | 7 | 60 | r.t. | hollow |
| 32 | 0.001 | 15 | r.t. | 7 | 120 | r.t. | hollow |
| 33 | 0.001 | 30 | 50 | 7 | 120 | 50 | hollow |
| 34 | 0.1 | 5 | 50 | 2 | 180 | 50 | hollow |
| 35 | 0.1 | 5 | 50 | 0.5 | 240 | 50 | hollow | r.t.: room temperature mixture was filtered and the filtrate was stripped of the hexane under a vacuum of 1 mmHg at 180° C., yielding 49 grams of a silazane polymer in the form of a viscous solid. The polymer had a melting point of 128° C. and a molecular weight of 1365 as measured by a benzene molar depression of freezing point method. It was soluble in hexane, benzene, THF and other organic solvents. An IR analysis of the polymer showed absorption peaks at 3400 cm$^{-1}$ for NH, 2980 cm$^{-1}$ for C—H, 2150 cm$^{-1}$ for Si—H, and 1260 cm$^{-1}$ for Si—CH$_3$.

The silazane polymer designated Polymer D was heated at 150° C. and melt spun through a spinneret having an orifice of 0.2 mm in diameter. The resulting green or pre-ceramic fibers had a diameter of 13 to 14 μm.

The fibers in a weight of 0.1 to 0.2 grams were rested on an alumina boat, which was placed in a mullite tube furnace of 50 mm in diameter. After the furnace was purged with an inert gas of N$_2$ or Ar, the furnace was ready for the first infusibilizing step. Nitrogen gas was passed through a bubbling apparatus charged with trichlorosilane, obtaining a nitrogen gas containing trichlorosilane gas in a predetermined concentration. The concentration of trichlorosilane gas was controlled in terms of temperature. The trichlorosilane-carrying nitrogen gas was passed through the furnace.

The second infusibilizing step was carried out by purging the furnace with an inert gas of N$_2$ or Ar again. The fibers were treated with ammonia gas or ammonia gas diluted with nitrogen gas in the concentration shown in Table 5, making the fibers infusible. After the fibers were treated with ammonia gas for a predetermined time, the furnace was purged with nitrogen gas again and heated to a temperature of 1200° C. at a rate of 150° C./hour in a nitrogen stream. The fibers were pyrolyzed at the temperature for 30 minutes and then cooled down.

As is evident from the data of Table 5, all the fibers were in hollow shape at the end of sintering. The sintered fibers of sample No. 33 were measured for physical properties. It was found from a photomicrograph of fiber cross section under a scanning electron microscope with a magnification X3,500 that the fibers were of hollow shape having an outer diameter of about 11 μm and an inner diameter of about 5 μm. They had a tensile strength of 120 kg/mm$^2$ and a tensile modulus of 13 t/mm$^2$. They were found to be ceramic fibers composed mainly of SiC and Si$_3$N$_4$ and having a composition: Si 61.5%, C 18.6%, and N 20.0%. An X-ray diffraction analysis of sample No. 33 was quite similar to the diagram of FIG. 2, indicating that the fibers were amorphous. The fibers were further heated at 1,700° C. and analyzed by X-ray diffraction again, which was quite similar to the diagram of FIG. 3, demonstrating that the fibers were of ceramics composed of SiC and Si$_3$N$_4$.

EXAMPLE 6

Fibers having a diameter of 12 to 13 μm obtained by melt spinning Polymer D in Example 5 were infusibilized and sintered by the same procedures as in Example 5 except that the infusibilizing agent used in the first infusibilizing step was changed.

Table 6 shows the conditions for the first and second infusibilizing steps as well as the appearance of sintered fibers.

TABLE 6

| Sample No. | First step | | | | Second step (Ammonia gas treatment) | | | Shape of fibers after sintering |
|---|---|---|---|---|---|---|---|---|
| | Type of agent | Gas Conc. (mol/l) | Treat time (min.) | Sample temp. (°C.) | Gas conc. (vol %) | Treat time (min.) | Sample temp. (°C.) | |
| 36 | SiCl$_4$ | 0.02 | 15 | 50 | 10 | 60 | 50 | hollow |
| 37 | SiCl$_4$ | 0.02 | 15 | 100 | 7 | 120 | 50 | hollow |
| 38 | BCl$_3$ | 0.02 | 30 | 70 | 7 | 180 | 50 | hollow |
| 39 | PCl$_3$ | 0.02 | 30 | 70 | 7 | 180 | 50 | hollow |
| 40 | TiCl$_4$ | 0.02 | 30 | 80 | 7 | 240 | 50 | hollow |
| 41 | AlCl$_3$ | 0.02 | 30 | 80 | 7 | 180 | 50 | hollow |
| 42 | AlCl$_3$ | 0.005 | 30 | 80 | 5 | 180 | 50 | hollow |

As is evident from the data of Table 6, better results were obtained when boron, phosphorus, titanium, and aluminum compounds were used as the infusibilizing agent in the first step instead of the silicon compound. In particular, the sintered hollow fibers of sample No. 39 which were treated with PCl$_3$ had an outer diameter of 12 μm and showed outstanding physical properties, a tensile strength of 150 kg/mm$^2$ and a tensile modulus of 14 t/mm$^2$.

EXAMPLE 7

The starting mixture was a mixture of methyldichlorosilane, 1,2-bis(methyldichlorosilyl)ethane, and methyltrichlorosilane in a proportion of 75:10:15 in mol %. A silazane polymer designated Polymer E was obtained by following the procedure of Example 5, that is, by reacting the chlorosilane mixture with ammonia and subjecting the ammonolysis product to deprotonation condensation in the presence of KH. The polymer had a melting point of 90° C. and a molecular weight of 820 as measured by a benzene molar depression of freezing point method.

Using spinning equipment as in Example 5, the silazane polymer designated Polymer E was melt spun at 110° C. into pre-ceramic fibers having a diameter of 13 to 14 μm. The fibers were placed in a mullite tube furnace, infusibilized by the same procedures as in Example 5 except that the infusibilizing agent and treating conditions were changed, and finally sintered as in Example 5.

Table 7 shows the conditions for the first and second infusibilizing steps as well as the appearance of sintered fibers.

TABLE 7

| Sample No. | First step | | | | Second step (Ammonia gas treatment) | | | Shape of fibers after sintering |
| --- | --- | --- | --- | --- | --- | --- | --- | --- |
| | Type of agent | Gas Conc. (mol/l) | Treat time (min.) | Sample temp. (°C.) | Gas conc. (vol %) | Treat time (min.) | Sample temp. (°C.) | |
| 43 | SiCl₄ | 0.05 | 30 | 50 | 10 | 60 | 50 | hollow |
| 44 | CH₃SiCl₃ | 0.05 | 30 | 50 | 7 | 240 | 50 | hollow |
| 45 | (CH₂=CH)SiCl₃ | 0.02 | 30 | 30 | 7 | 360 | 50 | hollow |
| 46 | ZrCl₄ | 0.02 | 30 | 50 | 7 | 180 | 50 | hollow |
| 47 | PBr₃ | 0.02 | 30 | 50 | 7 | 180 | 50 | hollow |
| 48 | PCl₅ | 0.02 | 30 | 50 | 7 | 180 | 50 | hollow |

As is evident from the data of Table 7, hollow fibers were obtained in all the runs.

EXAMPLE 8

A silazane polymer was prepared from a halosilane mixture according to the process of Japanese Patent Application No. 313264/1987. The starting mixture was a mixture of dimethyldichlorosilane and methylvinyldichlorosilane in a proportion of 50:50 in mol %. The chlorosilane mixture was reacted with ammonia in hexane solvent. The resulting ammonolysis product, 30 grams, was polymerized at 280° C. in the presence of 0.3 grams of KOH, yielding 24 grams of a silazane polymer designated Polymer F. The polymer had a melting point of 116° C. and a molecular weight of 1520 as measured by a benzene molar depression of freezing point method. An IR analysis showed absorption peaks at 3400 cm⁻¹ for NH, 2980 cm⁻¹ for C—H, 1420 cm⁻¹ for $CH_2=CH$, and 1260 cm⁻¹ for Si—CH₃.

Polymer F was melt spun at 135° C. by the same procedure as in Example 5, forming pre-ceramic fibers having a diameter of 12 to 13 μm. The fibers were placed in a mullite tube furnace, infusibilized by the same procedures as in Example 5 except that the infusibilizing agent and treating conditions were changed, and finally pyrolyzed at 1200° C. as in Example 5.

Table 8 shows the conditions for the first and second infusibilizing steps as well as the appearance of sintered fibers.

TABLE 8

| Sample No. | First step | | | | Second step (Ammonia gas treatment) | | | Shape of fibers after sintering |
| --- | --- | --- | --- | --- | --- | --- | --- | --- |
| | Type of agent | Gas Conc. (mol/l) | Treat time (min.) | Sample temp. (°C.) | Gas conc. (vol %) | Treat time (min.) | Sample temp. (°C.) | |
| 49 | CH₃SiCl₃ | 0.02 | 30 | 40 | 7 | 120 | 60 | hollow |
| 50 | SiCl₄ | 0.02 | 30 | 40 | 5 | 120 | 50 | hollow |
| 51 | (CH₂=CH)SiCl₃ | 0.02 | 30 | 40 | 7 | 120 | 60 | hollow |
| 52 | FeCl₃ | 0.1 | 30 | 50 | 7 | 120 | 50 | hollow |
| 53 | SnCl₄ | 0.05 | 30 | 50 | 7 | 120 | 50 | hollow |

As is evident from the data of Table 8, hollow fibers were obtained in all the runs.

There has been described a simple, commercially advantageous method for producing hollow ceramic fibers utilizing the precursor method without a need for advanced hollow fiber manufacturing technology. The resulting hollow ceramic fibers will find a variety of applications as light weight aggregates for composite materials and the like. Hollow ceramic fibers composed of SiC and Si₃N₄ and having high strength and modulus will result from the use of ceramic precursors in the form of the organic silazane polymers that the inventors previously proposed.

Several preferred embodiments have been described.

Obviously many modifications and variations of the present invention are possible in the light of the above teachings. It is therefore to be understood that within the scope of the appended claims, the invention may be practiced otherwise than as specifically described.

We claim:

1. A method for preparing a hollow ceramic fiber, comprising the steps of:
   (A) melt spinning an organic silazane polymer into a fiber,
   (B) treating the surface of the fiber with a gas containing the vapor of at least one compound selected from the group consisting of
   silicon compounds of formula (1):

$$R_aSiX_{4-a} \tag{1}$$

wherein R is a radical selected from the group consisting of hydrogen, lower alkyl, alkenyl, and aryl radicals, X is a chlorine, bromine or iodine atom, and letter a has a value of from 0 to 2, R radicals may be the same or different when a is equal to 2;

boron compounds of formula (2):

$$BX_3 \quad (2)$$

wherein X is as defined above;

phosphorus compounds of formula (3):

$$PX_b \quad (3)$$

wherein X is as defined above, and letter b is equal to 3 or 5; and metal compounds of formula (4):

$$MX_c \quad (4)$$

wherein M is a metal selected from the group consisting of Al, Ti, V, Fe, Ga, Ge, Zr, Nb, Sn, Sb, Te, Ta, W, and Bi, letter c is a number equal to the valence of the metal, and X is as defined above, (C) subjecting the fiber to hydrolysis with a water vapor-containing gas or ammonolysis with ammonia-containing gas, thereby forming an infusible layer on the fiber surface, and (D) subjecting the fiber to pyrolysis to form a hollow ceramic fiber having an empty interior.

2. The method of claim 1 wherein the organic silazane polymer is obtained by reacting a mixture of methyldichlorosilane, methyltrichlorosilane, and dimethyldichlorosilane with ammonia to form an ammonolysis product, and condensing the ammonolysis product in the presence of a basic catalyst capable of deprotonation.

3. The method of claim 2 wherein the mixture contains methyldichlorosilane, methyltrichlorosilane, and dimethyldichlorosilane in proportions of 55–80:10–30:5–25 in mol %.

4. The method of claim 1 wherein the organic silazane polymer is obtained by reacting a mixture of (i) at least one member selected from the group consisting of organic silicon compounds of general formula (I):

$$\begin{array}{c} R \quad R^1 \quad R^1 \quad R \\ | \quad | \quad | \quad | \\ X-Si-CH-CH-Si-X \\ | \quad \quad \quad \quad | \\ R \quad \quad \quad \quad R \end{array} \quad (I)$$

wherein R is a radical selected from the group consisting of hydrogen, chlorine, bromine, methyl, ethyl, phenyl, and vinyl radicals, $R^1$ is hydrogen or a methyl radical, and X is chlorine or bromine, and organic silicon compounds of general formula (II):

$$\begin{array}{c} R^2 \\ | \\ X-Si-X \\ | \\ X \end{array} \quad (II)$$

wherein $R^2$ is a radical selected from the group consisting of hydrogen, methyl, ethyl, phenyl, and vinyl radicals, and X is as defined above, and (ii) an organic silicon compound of general formula (III):

$$\begin{array}{c} R^2 \\ | \\ X-Si-X \\ | \\ R^2 \end{array} \quad (III)$$

wherein $R^2$ and X are as defined above, with ammonia, and deprotonation condensing the resulting ammonolysis product.

5. The method of claim 4 wherein the mixture contains compounds of formulae (I), (II), and (III) in proportions of 1–25:1–25:50–80 in mol %.

6. The method of claim 1 wherein the organic silazane polymer is obtained by reacting a mixture of (i) at least one member of organic silicon compounds of general formula (IV):

$$\begin{array}{c} R^3 \\ | \\ X-Si-X \\ | \\ R^3 \end{array} \quad (IV)$$

wherein $R^3$ is a radical selected from the group consisting of methyl, ethyl, and phenyl radicals, and X is chlorine or bromine, and (ii) at least one member of organic silicon compounds of general formula (V):

$$\begin{array}{c} R^3 \\ | \\ X-Si-X \\ | \\ R^4 \end{array} \quad (V)$$

wherein $R^3$ and X are as defined above, and $R^4$ is hydrogen or a vinyl radical, with ammonia to form a silazane compound, and polymerizing the silazane compound in the presence of an alkali catalyst.

7. The method of claim 6 wherein the mixture contains compounds of formulae (IV) and (V) in proportions of from 5:95 to 95:5 in mol %.

8. The method of claim 1 wherein the organic silazane polymer is obtained by heat polymerizing hexamethylcyclotrisilazane having the unit:

$$\begin{array}{c} CH_3 \\ | \\ -(Si-NH)_3- \\ | \\ CH_3 \end{array}$$

in the presence of KOH.

9. The method of claim 1 wherein the compound used in step (B) is selected from the group consisting of $CH_3SiCl_3$, $(CH_3)_2SiCl_2$, $(C_2H_5)SiCl_3$, $(C_2H_5)_2SiCl_2$, $C_6H_5SiCl_3$, $(C_6H_5)_2SiCl_2$, $CH_2=CHSiCl_3$, $(CH_2=CH)_2SiCl_2$, $HSiCl_3$, $H_2SiCl_2$, $SiCl_4$, $H(CH_3)SiCl_2$, $H(CH_2=CH)SiCl_2$, $(CH_2=CH)C_6H_5SiCl_2$, $BCl_3$, $BBr_3$, $BI_3$, $PCl_3$, $PCl_5$, $PBr_3$, $PI_3$, $AlCl_3$, $TiCl_4$, $FeCl_3$, $VCl_4$, $GaCl_3$, $GeCl_4$, $ZrCl_4$, $NbCl_5$, $SnCl_4$, $SbCl_3$, $TaCl_5$, $TeCl_4$, $WCl_5$, and $BiCl_3$.

10. The method of claim 1 wherein the compound is selected from the group consisting of $H(CH_3)SiCl_2$, $HSiCl_3$, $BCl_3$, $PCl_3$, $AlCl_3$, and $TiCl_4$.

11. The method of claim 1 wherein in step (B), the fiber is treated with an inert gas containing 0.0001 to 0.1 mol/liter of at least one compound selected from compounds of formulae (1) to (4) in vapor form at a temperature lower by 20° to 100° C. than the melting point of the organic silazane polymer for about 5 to about 240 minutes.

12. The method of claim 1 wherein the water vapor-containing gas used in step (C) is air or an inert gas containing water vapor in a saturated condition.

13. The method of claim 1 wherein the ammonia-containing gas used in step (C) is gaseous ammonia alone or an inert gas containing at least 0.01% by volume of gaseous ammonia.

14. The method of claim 1, wherein step (C) is at a temperature in the range of from 0° C. to a temperature lower by 30° C. than the melting point of the organic silazane polymer for about 30 to about 360 minutes.

15. The method of claim 12 wherein step (C) is at a temperature in the range of from 0° C. to a temperature lower by 30° C. than the melting pint of the organic silazane polymer for about 30 to about 360 minutes.

16. The method of claim 13 wherein step (C) is at a temperature in the range of from 0° C. to a temperature lower by 30° C. than the melting pint of the organic silazane polymer for about 30 to about 360 minutes.

17. The hollow ceramic fiber produced by the method of claim 1.

18. The hollow ceramic fiber produced by the method of claim 2.

19. The hollow ceramic fiber produced by the method of claim 3.

20. The hollow ceramic fiber produced by the method of claim 4.

* * * * *